(12) United States Patent
Dieffenderfer et al.

(10) Patent No.: US 6,970,962 B2
(45) Date of Patent: Nov. 29, 2005

(54) TRANSFER REQUEST PIPELINE THROTTLING

(75) Inventors: James N. Dieffenderfer, Apex, NC (US); Bernard C. Drerup, Austin, TX (US); Jaya P. Ganasan, Youngsville, NC (US); Richard G. Hofmann, Apex, NC (US); Thomas A. Sartorius, Raleigh, NC (US); Thomas P. Speier, Holly Springs, NC (US); Barry J. Wolford, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 246 days.

(21) Appl. No.: 10/440,778

(22) Filed: May 19, 2003

(65) Prior Publication Data
US 2004/0236888 A1 Nov. 25, 2004

(51) Int. Cl.[7] ............................................. G06F 13/00
(52) U.S. Cl. ........................ 710/112; 710/57; 710/54; 710/52; 710/310
(58) Field of Search .............................. 710/57, 54, 52, 710/310

(56) References Cited

U.S. PATENT DOCUMENTS

| | | | | |
|---|---|---|---|---|
| 5,548,733 A | | 8/1996 | Sarangdhar et al. ........ 395/286 |
| 5,699,516 A | * | 12/1997 | Sapir et al. .................. 710/110 |
| 5,784,579 A | | 7/1998 | Pawlowski et al. ......... 395/286 |
| 5,881,277 A | * | 3/1999 | Bondi et al. ................. 712/239 |
| 5,948,088 A | | 9/1999 | Sarangdhar et al. ........ 710/106 |
| 6,009,477 A | | 12/1999 | Sarangdhar et al. ........... 710/1 |
| 6,076,125 A | * | 6/2000 | Anand ........................ 710/107 |
| 6,081,860 A | * | 6/2000 | Bridges et al. ............. 710/110 |
| 6,154,800 A | * | 11/2000 | Anand ........................ 710/107 |
| 6,266,750 B1 | * | 7/2001 | DeMone et al. ............ 711/169 |
| 6,317,803 B1 | * | 11/2001 | Rasmussen et al. ........ 710/107 |
| 6,317,806 B1 | * | 11/2001 | Audityan et al. ........... 711/101 |
| 6,460,119 B1 | * | 10/2002 | Bachand et al. ............ 711/146 |
| 6,578,116 B2 | * | 6/2003 | Bachand et al. ............ 711/146 |

(Continued)

OTHER PUBLICATIONS

"Scalable address pipeline on buses of computer systems", Hofmann et al, Dossier RAL920000072, Jun. 06, 2000.

(Continued)

*Primary Examiner*—Glenn A. Auve
*Assistant Examiner*—Donna K. Mason
(74) *Attorney, Agent, or Firm*—Patrick J. Daugherty; Driggs, Lucas, Brubaker & Hogg Co., LPA

(57) ABSTRACT

A method and system for a pipelined bus interface macro for use in interconnecting devices within a computer system. The system and method utilizes a pipeline depth signal that indicates a number N of discrete transfer requests that may be sent by a sending device and received by a receiving device prior to acknowledgment of a transfer request by the receiving device. The pipeline depth signal may be dynamically modified, enabling a receiving device to decrement or increment the pipeline depth while one or more unacknowledged requests have been made. The dynamic modifications may occur responsive to many factors, such as an instantaneous reduction in system power consumption, a bus interface performance indicator, a receiving device performance indicator or a system performance indicator.

19 Claims, 4 Drawing Sheets

U.S. PATENT DOCUMENTS

| | | | |
|---|---|---|---|
| 6,633,972 B2 * | 10/2003 | Konrad | 712/219 |
| 6,665,756 B2 * | 12/2003 | Abramson et al. | 710/107 |
| 6,668,309 B2 * | 12/2003 | Bachand et al. | 711/146 |
| 6,772,254 B2 * | 8/2004 | Hofmann et al. | 710/110 |
| 6,839,833 B1 * | 1/2005 | Hartnett et al. | 712/229 |
| 6,848,029 B2 * | 1/2005 | Coldewey | 711/137 |
| 2002/0010831 A1 * | 1/2002 | DeMone et al. | 711/105 |
| 2002/0053038 A1 * | 5/2002 | Buyuktosunoglu et al. | 713/320 |
| 2002/0078269 A1 * | 6/2002 | Agarwala et al. | 710/22 |
| 2002/0116449 A1 * | 8/2002 | Modelski et al. | 709/203 |
| 2002/0120796 A1 * | 8/2002 | Robertson | 710/54 |
| 2002/0120828 A1 * | 8/2002 | Modelski et al. | 712/200 |
| 2003/0131164 A1 * | 7/2003 | Abramson et al. | 710/58 |
| 2003/0140216 A1 * | 7/2003 | Stark et al. | 712/214 |
| 2004/0010652 A1 * | 1/2004 | Adams et al. | 710/313 |
| 2004/0064662 A1 * | 4/2004 | Syed et al. | 711/169 |

OTHER PUBLICATIONS

"A Case for Dynamic Pipeline Scaling", Koppanalil et al, Department of Electrical and Computer Engineering, North Carolina State University. 2002.

"Adaptive Pipeline Depth Control for Processor Power-Management", Efthymiou et al, Department of Computer Science, The University of Manchester.

"Application-Driven Processor Design Exploration for Power-Performance Trade-off Analysis", Marculescu et al, Dept. of Electrical and Computer Engineering, Carnegie Mellon University, Computer Aided Design, IEEE, 2001.

"Method to Maintain Pipeline Throughput While Pipeline Depth is Allowed to Vary", IBM Technical Disclosure Bulletin, vol. 39, No. 5, May, 1996.

* cited by examiner

TRANSFER REQUEST PIPELINE THROTTLING

FIELD OF THE INVENTION

The invention generally relates to computer systems and in particular relates to pipelined bus systems for use in interconnecting devices within a computer system.

BACKGROUND OF THE INVENTION

It is common for computer bus systems to allow pipelining of multiple bus transactions. Pipelining occurs when subsequent transaction requests are made prior to the completion of outstanding transaction requests. Bus transactions may be requested for one transaction while data transfer is performed concurrently for a separate bus transaction. In this manner, multiple transactions can be processed in parallel with different phases of the separate bus transactions performed concurrently.

Power consumption is an important issue for computer systems and integrated systems-on-a-chips (SOC's). In some applications, low power consumption may be more important and desirable than high performance, such as in battery-powered cellphone or personal digital assistant (PDA) applications. Therefore, it is acceptable to provide a means to select a reduction in processing capability where a corresponding reduction in power consumption is obtained. For example, it may be preferable to reduce transaction processing capability as a trade-off for a reduction in power consumption. This can be accomplished by varying the depth of the bus pipeline, wherein a shorter bus pipeline would decrease processing capability, slow the system and reduce power consumption by spreading the bus transaction requests over a longer period of time, effectively reducing the number of transfer requests per unit of time. A reduction in the number of transfer requests per unit of time results in reductions in the power consumptions of the devices receiving such requests.

It is desirable to provide a bus mechanism to allow the depth of the bus pipeline to be varied in accordance with power consumption constraints or particular processing constraints of the agents connected to the bus. One proposed solution is taught by U.S. Pat. No. 5,548,733 to Sarangdhar et al., entitled "METHOD AND APPARATUS FOR DYNAMICALLY CONTROLLING THE CURRENT MAXIMUM DEPTH OF A PIPELINED COMPUTER BUS SYSTEM." Individual bus agents transmit signals to the central arbiter, which responsively controls the depth of the pipeline in accordance with the signals received from each of the various bus agents. Thus, one slave device effectively sets a common lowest-common denominator master pipeline depth for all slaves.

However, non-optimal results are obtained where each of the devices or agents connected to the bus is not capable of accommodating the maximum depth of the bus pipeline. For example, if one particular agent is only capable of accommodating a pipeline having a depth of two, then, even though other agents can pipeline deeper, this capability is never utilized. Therefore, the effective maximum depth for a bus pipeline is constrained by the agent that can accommodate only the shallowest bus pipeline depth.

Moreover, the bus depth to which any particular agent is capable of accommodating may depend on the particular hardware of the bus agent or it may depend upon the current state of the bus agent. For example, during start-up or initialization of an agent, the agent may not be capable of processing any bus transactions, whereas once the agent has been fully activated, the agent may be capable of accommodating a bus pipeline depth of five. In other cases, the maximum depth to which an agent can process bus requests is a dynamic function of the current state of input and output queues connected to the bus. For example, if the input queue of a bus agent is empty, the agent may be capable of accommodating a pipeline depth of five. However, if the queue of the bus agent is full or nearly full, the agent may only be capable of accommodating a bus pipeline depth of one or two.

What is needed is a system and method that allows a request pipeline depth setting such that not all masters and cache snooping devices in a system are bound to the least common denominator of all receiving devices. What is also needed is a dynamic adjustment means of pipeline depth setting, wherein the pipeline depth setting can be increased or decreased responsive to the capabilities of the system devices, processing capability and power consumption requirements.

SUMMARY OF THE INVENTION

A method and system for a pipelined bus interface macro for use in interconnecting devices within a computer system. The system and method utilizes a pipeline depth signal that indicates a number N of discrete transfer requests that may be sent by a sending device and received by a receiving device prior to acknowledgement of receipt of the transfer requests by the receiving device. The pipeline depth signal may be dynamically modified, enabling a receiving device to decrement or increment the pipeline depth while one or more unacknowledged requests have been made. The dynamic modifications may occur responsive to many factors, such as an instantaneous reduction in system power consumption, a bus interface performance indicator, a receiving device performance indicator or a system performance indicator.

DESCRIPTION OF THE PREFERRED EMBODIMENTS

Figure 1:
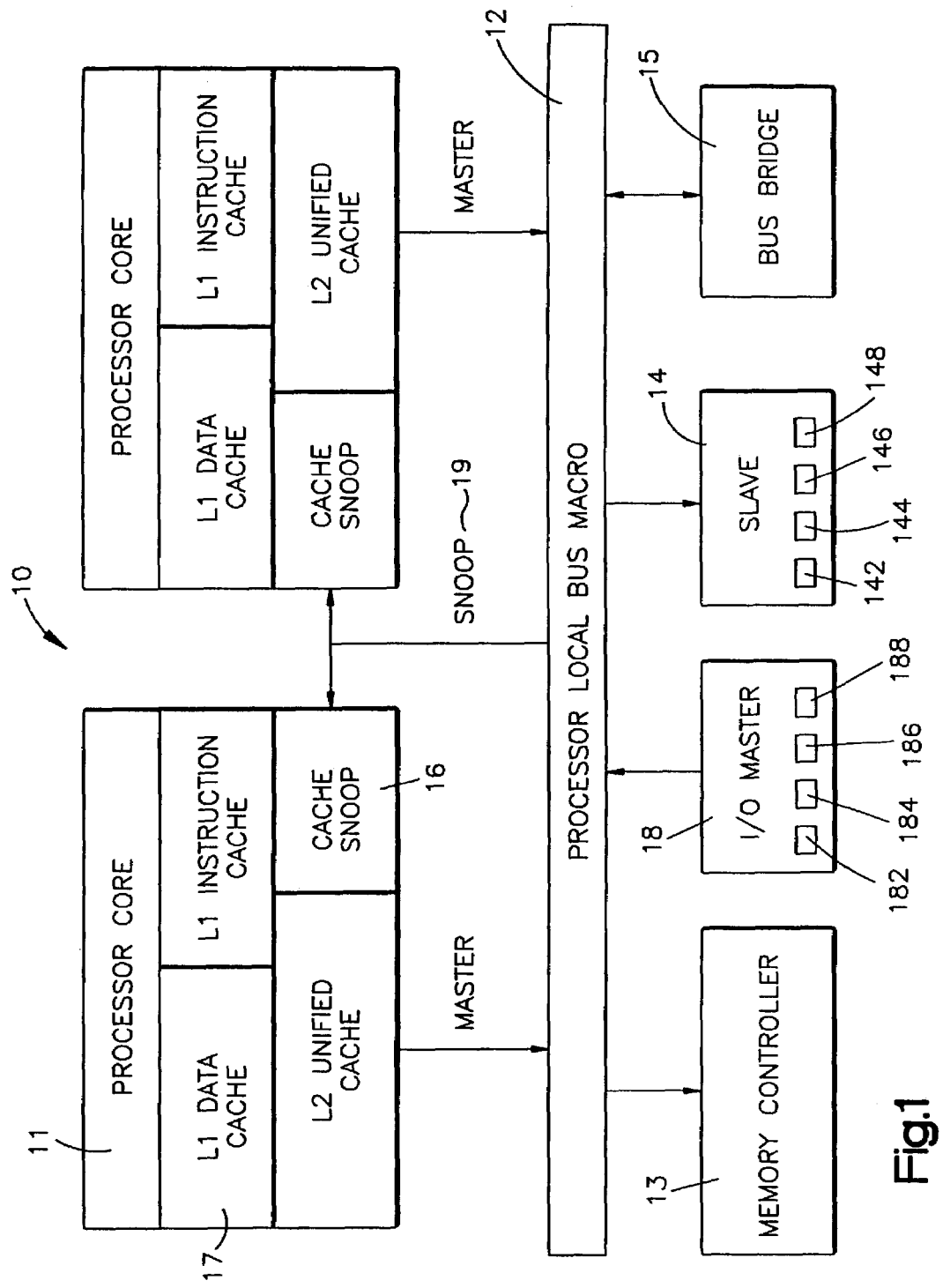
FIG. 1 is a block diagrammatic representation of a computer system incorporating the present invention.

Referring now to FIG. 1, in one embodiment of the present invention a Processor Local Bus (PLB) architecture method and system 10 is provided. It will be readily apparent that the present invention may be adapted to other computer architectures. A processor local bus (PLB) macro 12 is provided. In the present embodiment, the PLB macro 12 is a high bandwidth, low latency interconnect with 64-bit address and 128-bit data buses which provide a standard interface between processor cores 11, memory controllers 13, various slaves 14, bus bridges 15, cache snooping devices 16, and master devices 18. The present invention may also be practiced with other bus macros having other address and data bus widths, providing alternative device interface functions. The PLB macro 12 is intended to allow the interconnection of higher performance components inside of a typical SOC design.

The system 10 architecture supports read and write transfers between all master devices 18 initiating requests and all slave devices 14 receiving requests (the master/slave interface). It also supports snoop requests broadcast to the snooping master devices 16 and acknowledgement sent back with the results from each. The snooping master devices 16 interface the snoop bus 19 with their cache components 17 to provide cache management functions (the snoop interface). Each master device 18 is attached to the PLB macro 12 through separate address 182, control 184, read data 186, and write data 188 buses. Each slave device 14 is attached to the PLB macro 12 via address 142, control 144, read data 146, and write data 148 buses. A slave 14 may or may not share this set of signals with another slave 14. The separate master read 186 and write 188 data buses allow master devices 18 to simultaneously receive read data from the PLB macro 12 and provide write data to the PLB macro 12. The separate slave read 146 and write 148 data buses allow slave devices 14 to simultaneously provide read data to the PLB macro 12 and accept write data from the PLB macro 12.

The PLB macro 12 bus structure can be implemented in a wide variety of configurations. The basic architecture is a "store and forward" design where all master request information is registered and subsequently broadcast to a slave 14. Read and write data is also registered in the PLB macro 12 between the master 18 and slave 14. The PLB macro 12 can be implemented as a simple shared bus where master devices 18 arbitrate for control of a single bus to which all slave devices 14 are attached. The bus structure can also be built as a crossbar design where multiple slave buses exist and master devices 18 arbitrate for these buses independently. The slave buses are differentiated by address mapping which is performed inside the PLB macro 12. Slaves 14 on each way decode addresses broadcast on their way to determine if they are the device being selected for data transfer. A crossbar allows dataflow between more than one slave bus segment at a time. This parallelism enables simultaneous data transfer in the same direction between different master and slave devices. Crossbar structures attaching a single slave to one slave bus segment and multiple slaves attached to another segment can be implemented. This is referred to as a hybrid crossbar. This allows a single design to be used in multiple SOCs with slightly different combinations of devices attached. Slave devices which do not require the highest performance, or frequent access, will typically be attached to a shared bus segment when a single segment is not available for each slave.

The system 10 architecture supports multiple processor cores 11 attached to the PLB bus macro 12 as autonomous master units. The architecture includes hardware enforced cache coherency. The PLB bus macro 12 supports shared coherent memory between multiple processors 11 and other caching coherent snooping master devices ("snoopers") 16. This is achieved by a dedicated address snooping interface between the PLB bus macro 12 and snooping devices 16. "Snooping" is defined as the task of a caching coherent snooping master device 16 to monitor all memory accesses to coherent memory to ensure that the most recent version of memory data is presented to a requesting master. Cache snooping devices 16 are also described in a related U.S. patent application to Dieffenderfer et al., entitled "TARGETED SNOOPING" filed on Mar. 20, 2003 Ser. No. 10/393,116, the entire disclosure of which is hereby incorporated into this application.

The PLB bus macro 12 divides coherent memory into 32-byte coherence granules. This allows the PLB bus macro 12 to perform snoop operations on multiple coherence granules during a single operation, or tenure. This is referred to as the "snoop burst protocol." The snoop burst protocol allows processors 11, which are typically operating at a higher frequency than the PLB bus macro 12, to pipeline snoops into their cache hierarchy, ultimately producing better performance for both the processor 11 and the PLB bus macro 12.

Figure 2:
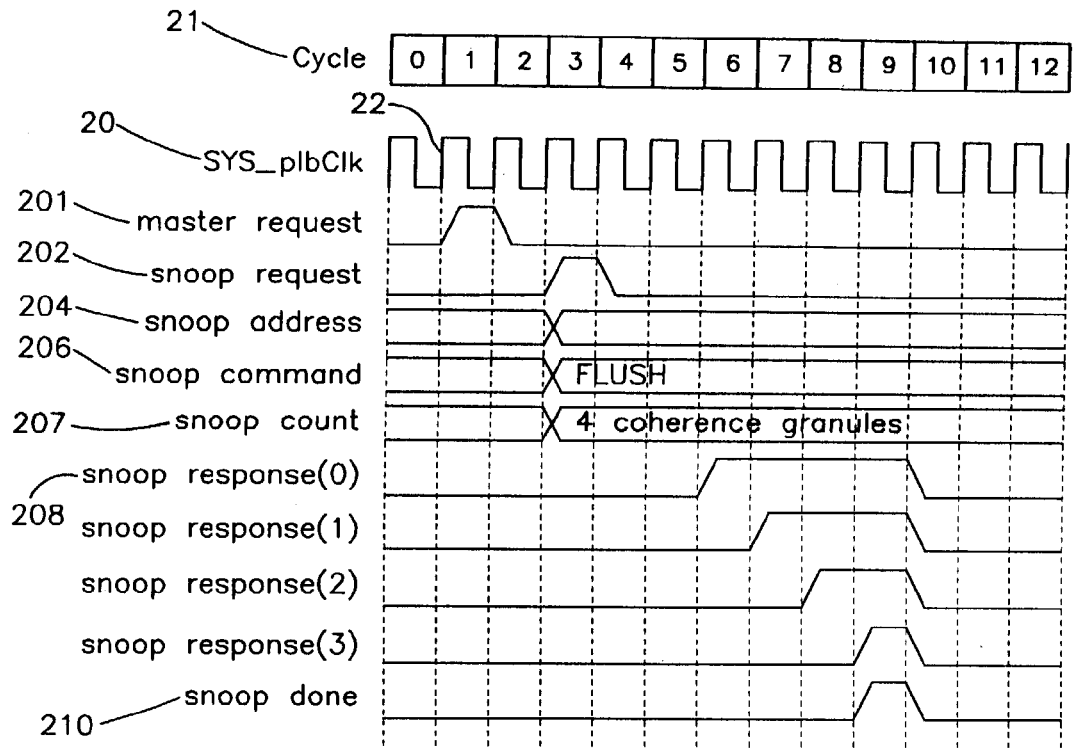
FIG. 2 is a graphical timing diagram representation of a snoop burst command according to the present invention.

FIG. 2 illustrates a 4 coherence granule FLUSH snoop burst command according to the present embodiment. (In FIGS. 2 through 6, the system clock signal SYS_plbClk 20 is illustrated in waveform format; as is conventional, a specific clock signal 20 or its rising edge 22 may be identified by the corresponding Cycle identifier 21 appearing immediately above it.) The master 18 makes a snoopable request 201 at the rising edge 22 of clock signal 20 in Cycle 1. The start of a snoop operation is indicated by a snoop request 202 being broadcast to all snooping master devices 16 on the rising edge 22 of clock signal 20 in Cycle 3. The snoop address 204, snoop command 206, and the snoop count 207 (the number of coherence granules to snoop) is also sent with the snoop request 202. The snooping master devices 16 individually provide acknowledgement that they have snooped a particular 32-byte coherence granule by asserting snoop response signal 208 for each coherence granule snooped. Snooping master devices 16 may assert more than one snoop response signal 208 at a time. This indicates that multiple coherence granules have been snooped during the given interval. The assertion of a snoop response signal 208 and a snoop hit (not shown) for a particular coherence granule indicates the presence of the snooped coherence granule in the snooping master device's 16 cache. Snooping master devices 16 also indicate whether or not they must perform a snoop castout of modified data for a particular coherence granule by asserting a snoop castout indication (not shown). When the snoop operation is completed, the snooping device 16 asserts a snoop done indication 210. For line type transfers, only 1, 2, 4, or 8 sequential coherence granules are snooped. For burst type transfers, 1–8 sequential coherence granules are snooped.

To maximize propagation time and provide a deterministic timing budget between the various agents attached (for example cores 11, memory controllers 13, slaves 14, etc.), the PLB bus macro 12 implements a fully synchronous "register-to-register pulse protocol."

Figure 3:
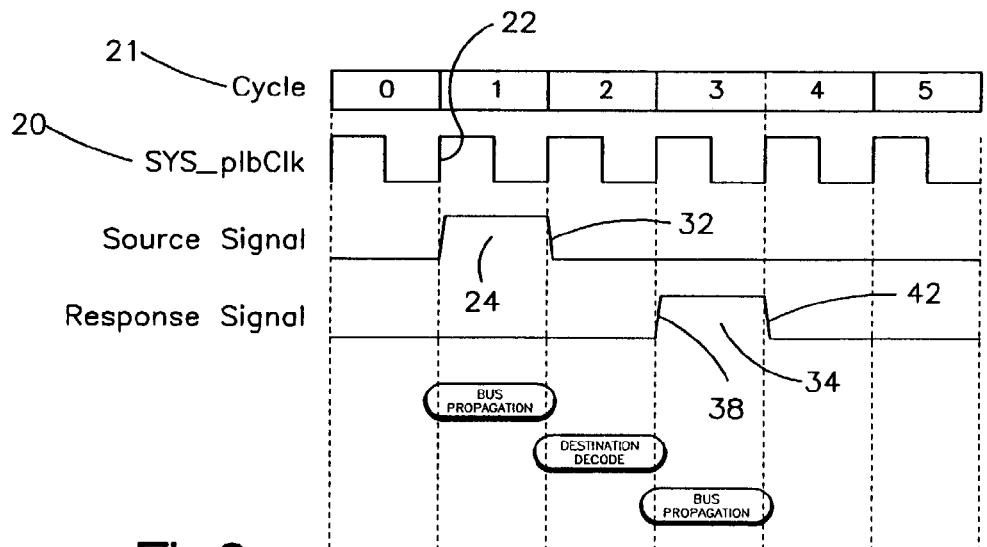
FIG. 3 is a graphical timing diagram representation of a series of information source and response signals according to the present invention.

Referring now to FIG. 3, in this type of protocol in the interface between the master 18 and the PLB macro 12, between the PLB macro 12 and the slaves 14, and between the PLB macro 12 and the snooping devices 16, any signal interactions are asserted on the rising edge 22 of a SYS_plbClk clock signal 20 in a Cycle N by the source and captured by the destination at the rising edge 22 of the next clock signal 20 in Cycle N+1. Therefore, the destination cannot respond immediately because it needs time to determine the proper response from the registered signal. This requires at least one clock cycle of "latency" before the destination can subsequently assert a response signal on the next clock signal 20 in Cycle N+2. At the rising edge 22 of clock signal 20 at Cycle 1, a source (a master device 18 or the bus macro 12) asserts a control signal 24. The control signal 24 propagates to a destination (the PLB macro 12, slave 14, or cache snooping device 16) during Cycle 1. At the rising edge 22 of clock signal 20 in Cycle 2, the destination registers the signal and the source deasserts 32 the control signal 24. The destination has a full clock Cycle 2 to decode this control signal 24 and generate the appropriate response signal 34. The destination may insert wait cycles prior to responding. At the rising edge 22 of clock signal 20 in Cycle 3, the destination asserts 38 its response signal 34. The response signal 34 propagates back to the source during Cycle 3. At the rising edge 22 of clock signal 20 in Cycle 4, the destination deasserts 42 its response signal 34.

The system 10 architecture uses a "request and acknowledge" protocol for master devices 18 to communicate with the PLB macro 12, for the PLB macro 12 to communicate with slave devices 14, and for snoop requests from the PLB macro 12 to communicate with the snoop devices 16. An information transfer begins with a request and is confirmed with an acknowledge. Master 18 requests are made to the bus macro 12 and some time later these requests are broadcast to the slave 14, and to cache snooping devices 16 if a cache snooping operation is requested. Two types of information requests may be performed.

Figure 4:
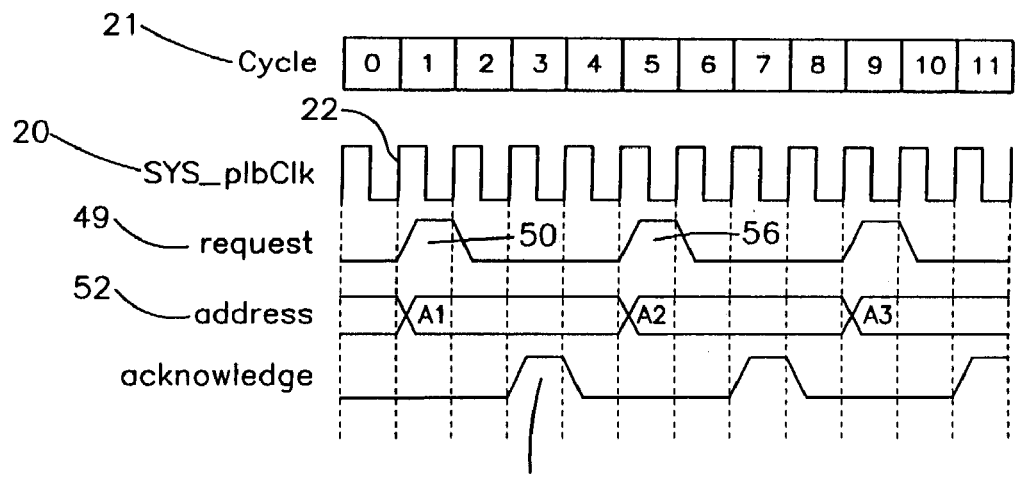
FIG. 4 a graphical timing diagram representation of a series of "non-intra-address" request pipelined transactions according to the present invention.

FIG. 4 illustrates the first type, a non Intra-Address Pipeline (non-IAP) mode of operation. The information transfer begins at the rising edge 22 of clock signal 20 in Cycle 1 with the assertion of a request signal 49. The source of the transfer (a master device 18, processor core 11 or PLB bus macro 12) asserts the request signal 49 having address 52 "A1." Then the initiating device waits for confirmation 54 from the PLB bus macro 12 if it's a master request, the slave 14 if it's a PLB macro 12 request, or the cache snooping device 16 if it's a snoop request, prior to making another request 56 having address 52 "A2".

Figure 5:
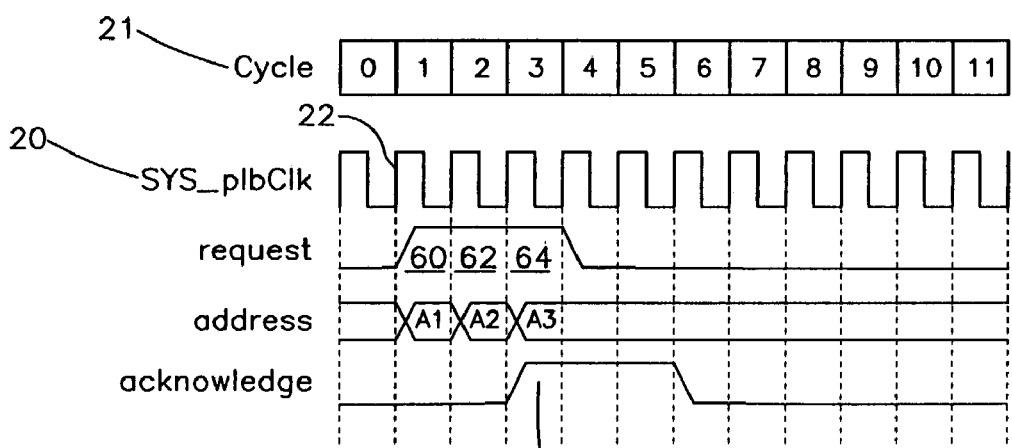
FIG. 5 is a graphical timing diagram representation of a series of "intra-address" request pipelined transactions according to the present invention.

FIG. 5 illustrates the second type of request, Intra-Address Pipeline (IAP) mode requests 60, 62 and 64. At the rising edge 22 of clock signal 20 in Cycle 1, the source of the transfer (again a master device 18 or bus macro 12) asserts a request 60 having address A1. However, in this case the initiating device does not wait for a confirmation 68 from the bus macro 12, slave 14 or cache snooping device 16 prior to making additional requests 62 having address A2 and 64 having address A3. Thus, the initiating device does not wait for a previous "address tenure" to complete prior to making another request.

Thus, the IAP mode mechanism has the effect of eliminating latency associated with making subsequent requests. What is important in the present invention is that a means is provided within all request/acknowledge interfaces such that the device that is making transfer requests knows how many unacknowledged requests the receiving device can accept ("N") prior to an overflow situation. This limits the requesting device from making an N+1 request. In a preferred embodiment, this is accomplished by "request pipeline depth" signals asserted by the receiving device and sampled by the requesting device.

The PLB bus macro 12 architecture also supports Intra-Address pipelined (IAP) snoop tenures. As described above, the broadcasting of multiple requests between devices prior to a response signal from the destination is allowed. This approach applied to the snoop bus interface allows multiple snoop tenures to be broadcast to the snooping devices 16 before receiving any response signals for preceding snoop request signals. This coupled with the snoop burst protocol allows very efficient communication of snoop information between the PLB bus macro 12 and the snooping devices 16.

What is also important is that the present invention enables a receiving device to dynamically decrement, and subsequently increment, the request pipeline depth while one or more unacknowledged requests have been made. This may occur for several reasons; for example, responsive to a request for a reduction in instantaneous power consumption. The number of total requests made is not reduced just how many are issued per unit time creating a lower power quiescent mode of operation. This can be advantageous from a system level perspective when it is recognized that the initiation of each request increases the power consumption of the PLB bus macro 12 and of all devices receiving such requests and their associated processing activities based on these requests.

The request pipeline depth signals are sampled by the "sending device" (from master 18 to bus macro 12, or PLB macro 12 to slave 14 or snooper 16) prior to asserting the request signal. They are asserted by the "receiving device" to indicate to the "sending device" how many requests can be request pipelined to it prior to completion of the first, or oldest, "request tenure." The request tenure may be defined as the period from the assertion of a request signal until the sampling of a corresponding response signal by a requesting device. The sending device must sample these pipeline depth signals prior to a request and not assert its request signal when the depth is reached until completion of the earliest preceding request tenure. The value of a request pipeline depth signal can both increase and decrease while an uncompleted request tenure exists between the "sending device" and the "receiving device". Two cases exist. In the first case, the "receiving device" increases the value of the request pipeline depth signals to the "sending device". Once the "sending device" detects this, it is allowed to immediately request pipeline to the new depth. In the second case, the "receiving device" decreases the value of the request pipeline depth signals to the "sending device." Following the decrease of the pipeline depth value while the "sending device" has an outstanding uncompleted request tenure, the "receiving device" assumes the request pipeline depth is only reduced by a depth of one with each assertion of a request tenure completion subsequent to its decrementation of the pipeline depth. This decrementation mechanism could be utilized by the "receiving device" to reduce instantaneous power consumption by "spreading" pipelined requests out over a larger time period.

Figure 6:
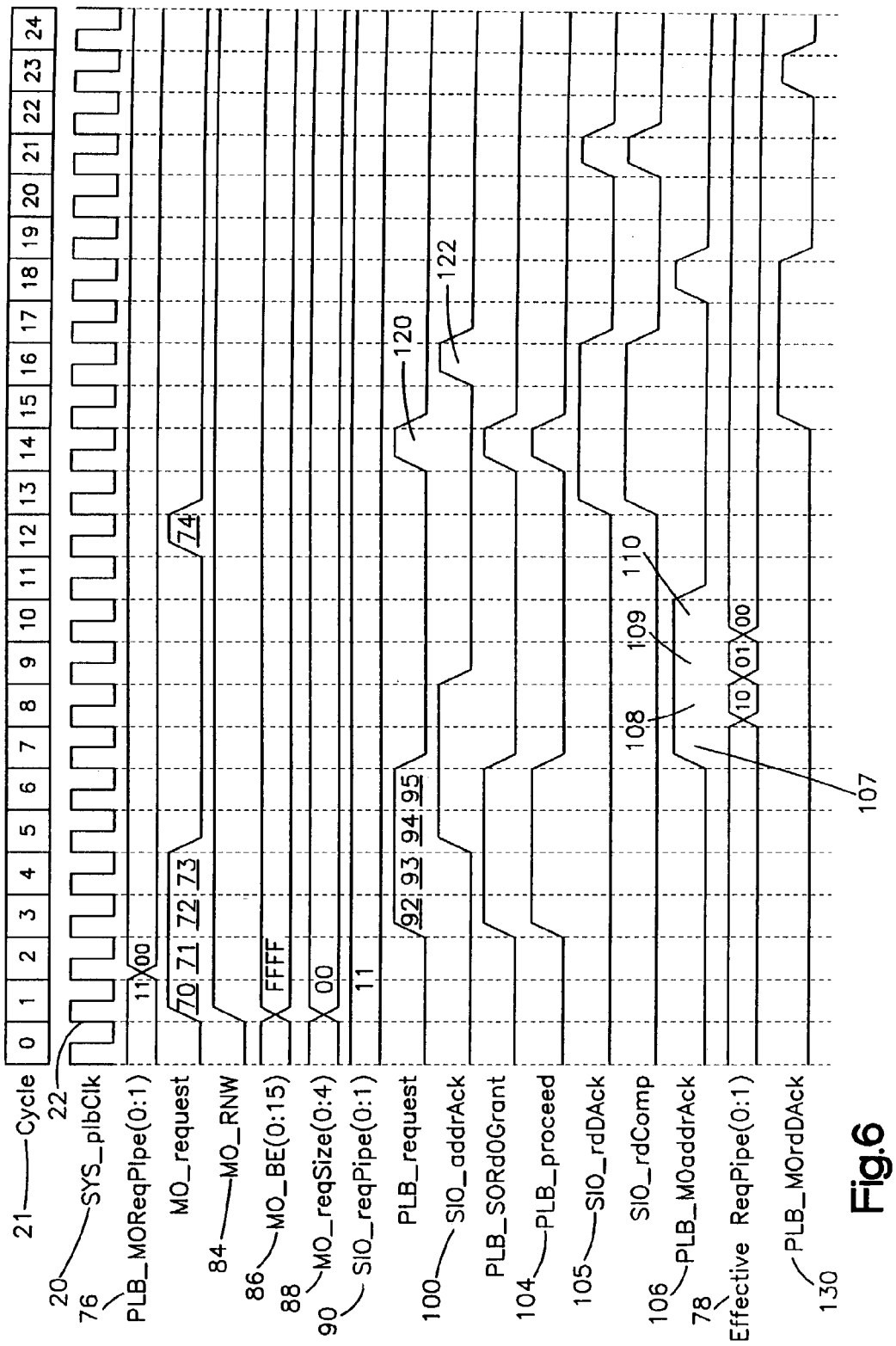
FIG. 6 is a graphical timing diagram representation of a series of "intra-address" request pipelined depth decrementation transactions according to the present invention.

FIG. 6 shows five read transfers according to the present invention via PLB data bus macro 12: four pipeline burst read transfers of one data beat each 70, 71, 72 and 73; and one single data beat read transfer 74. All read data transfer occurs as normal. The destination component of the requests 70–74 in this case is the PLB macro 12 itself. The PLB macro 12 asserts a pipeline depth indicator "PLB_M0ReqPipe" 76 value of "four deep" as indicated by the two-bit binary value of "11" prior to Cycle 2. Thus, at the time of the first request 70, at the rising edge 22 of clock signal 20 in Cycle 1, the PLB macro 12 is indicating that it can receive up to four transfer requests. The master's 18 intent is to make five total requests. Prior to making a request, the master 18 samples the depth indicator value 76, recognizes that it can send up to four requests without waiting for acknowledgement between requests. The master 18 accordingly sends requests 70–73 to the PLB macro 12.

Subsequent to the first request 70, the pipeline depth indication 76 immediately decrements all the way down to one-deep during Cycle 2, as indicated by the binary value of "00." The master device 18 does not recognize this decrementation until Cycle 8, when the master 18 has sampled the assertion of the PLB_M0addrAck signal 106 completing the oldest outstanding request tenure. Whereupon the master device Effective ReqPipe value 78 is accordingly decremented. As the master 18 continues to sample the PLB_M0addrAck signal 106, the Effective ReqPipe value 78 is decremented down to one deep over the three Cycles 8, 9 and 10. In Cycle 10, the master 18 is aware that the pipeline depth is one-deep. At the rising edge 22 of clock signal 20 in Cycle 11, the master 18 samples the last PLB_M0addrAck signal 110, which indicates that the pipeline is now empty (there are no outstanding transfer requests). The master 18 can now make the fifth request 74 because the pipeline is empty and the pipeline depth 76 indicates that a pipeline depth of one is available. At the rising edge 22 of clock signal 20 in Cycle 12, the master 18 then asserts the last request 74.

Master transfer attributes (read or write, byte enables and requested size of transfer) are also indicated in the timing diagram shown in FIG. 6. Read/not write attribute M0_RNW 84 indicates whether this is a "read" or "write" transfer. Accordingly, when the value is high, as it is in Cycle 1 and throughout the remainder of the timing diagram, a read operation is being requested. The master byte enable value 86 indicates that the master wants to transfer data on all 16 byte lanes of the Master read data bus 186 and, therefore, this value is set to hexadecimal (FFFF). And lastly, the requested size of transfer attribute 88 broadcast by the master 18 is one data beat, as indicated by a binary value of "00".

In Cycle 1, the master 18 initiates a first read request 70 to the PLB macro 12. The request 70 gets registered by the PLB bus macro 12, and the PLB bus macro 12 arbitrates the request 70 during Cycle 2 and initiates a slave request 92 at the rising edge 22 of clock signal 20 in Cycle 3 in a "store and forward" type of structure to the appropriate slave device 14. During the arbitration process in Cycle 2, the PLB macro 12 determines that the slave request pipeline depth value 90 is set to four-deep (binary "11"). Accordingly, the PLB macro 12 immediately transmits the series of four requests 92–95 generated by the master 18 to the slave device 14.

In the example illustrated in FIG. 6, the slave request pipeline depth value 90 is static and is set to four-deep (binary "11"). However, it is to be understood that this value can vary dynamically, similar to the above-described master interface. Also, other slaves 14 may have different pipeline depth values 90. If, for example, the depth value 90 is less than four, such as "one," then the PLB macro 12 buffers the excess requests 93–95 and meters at the depth available: where the depth value 90 is one, then one at a time to the slave device 14.

As described earlier in the specification, due to the register-to-register protocol of the present system 10, the transfer requests 92–95 initiated in Cycle 3 do not begin to be acknowledged 100 by the slave until Cycle 5. At the rising edge 22 of clock signal 20 in Cycle 3, the PLB macro 12 tells the slave 14 that it wants to request a data transfer by asserting the request signal 92. At the rising edge 22 of clock signal 20 in Cycle 4, the slave 14 captures the request 92 and, during Cycle 4, the slave 14 decodes a response. Then at the rising edge 22 of clock signal 20 in Cycle 5, the slave 14 asserts an acknowledge signal 100.

The PLB macro proceed signal 104 value is related to the cache snooping results of the present system 10. When the proceed signal 104 is asserted, then the current transaction will not be terminated and the slave 14 goes forward with providing the read data.

Returning again to the slave acknowledgment signal 100, it is asserted at the rising edge 22 of clock signal 20 in Cycle 5 by the slave 14 to communicate to the PLB macro 12 that the slave 14 has acknowledged and received bus request 92, which is the master request 70 through the PLB macro 12. After a latent Cycle 6 created by the register-to-register protocol architecture, the PLB macro 12 processes the slave acknowledgment signal 100 and asserts the master acknowledgement signal "PLB_M0addrAck" 106 in Cycle 7. Responsive to each of the acknowledged request transactions 107–110, the effective request pipeline depth value 78 is decremented by one, so that at the rising edge 22 of clock signal 20 in Cycle 10 the effective request pipeline depth is now one-deep. Accordingly, at Cycle 12 the master device 18 now asserts the last request 74 of the five desired requests 70–74.

Master request 74 is then captured by the PLB macro 12 and is forwarded on to the slave as PLB request 120 at the rising edge 22 of clock signal 20 in Cycle 14. In a similar fashion to the preceding transfers described above, the slave captures the request 120, decodes and responds to the request 120 with an address acknowledgment 122 at the rising edge 22 of clock signal 20 in Cycle 16. The PLB macro 12 asserts the PLB_M0addrAck signal 106 at the rising edge 22 of clock signal 20 in Cycle 18. Several clocks later at the rising edge 22 of clock signal 20 in Cycle 21, the slave 14 returns the read data back to the PLB macro 12 as indicated by the assertion of the S10_rdDAck signal 105. The PLB macro 12 captures the read data. The PLB macro 12 then forwards the data on to the master 18 at the rising edge 22 of clock signal 20 in Cycle 23. Thus, the master 18 decrements the effective pipeline depth downward for each request acknowledgement 107–110 that it gets responsive to its requests 70–74 until it recognizes that it can go no lower (i.e., it has reached "00" for maximum depth of one request at a time), until the PLB macro 12 indicates to the master 18 that it increased the pipeline depth.

As illustrated, the PLB bus macro 12 can dynamically make instantaneous changes in pipeline depth settings by increasing or decreasing the pipeline depth settings responsive to outstanding transactions. The pipeline depth indicator PLB_M0ReqPipe 76 value may also be dynamically increased or decreased responsive to the performance and power consumption of the PLB macro 12, the master 18 and slave devices 14 (the master/slave interface), the processor 11 cache components 17 and the snooping master devices 16 (the snoop interface).

One advantage of the present invention is that there is no requirement that the requesting device and receiving device be in an "idle" state when the pipeline depth is changed. Also, this invention indicates the maximum pipeline depth immediately thus allowing high throughput intra-address pipelining without sampling the pipeline depth or receiving transfer credit signals prior to each individual request. No clocks must be inserted between depth change indications. Another important advantage of the present invention is that each interface between each master, slave, cache snooper and PLB bus macro can be set to any desired pipeline depth independently of any other master, slave, cache snooper and PLB bus interface. Since the pipeline depth of each interface can be independently adjusted, the present invention provides the best mix and highest granularity of system performance and power savings management.

The snoop interface can also be controlled in order to modulate the cache performance and power consumption of the caches.

While preferred embodiments of the invention have been described herein, variations in the design may be made, and such variations may be apparent to those skilled in the art of computer system design, as well as to those skilled in other arts. The computer system and device components identified above are by no means the only system and devices suitable for practicing the present invention, and substitute system architectures and device components will be readily apparent to one skilled in the art. The scope of the invention, therefore, is only to be limited by the following claims.

What is claimed is:

1. A pipelined bus system for use in interconnecting devices within a computer system comprising a sending device connected to a receiving device through a processor local bus interface;
    wherein the receiving device asserts a request pipeline depth signal, the request pipeline depth signal indicating a number N of discrete transfer requests that may be sent by the sending device prior to acknowledgment of receipt of a transfer request by the receiving device;
    wherein the sending device is configured to sample the request pipeline depth signal and responsively assert a first request signal comprising no more than N transfer requests without waiting for a first request reception acknowledgment; and
    wherein the receiving device is configured to modify the request pipeline depth signal to either increase or decrease the number N to a number Y prior or subsequent to a first request reception acknowledgement received by the sending device, and the sending device is configured to sample the modified request pipeline depth signal after a first request reception acknowledgment and responsively assert a second request signal comprising no more that Y transfer requests without waiting for a second request reception acknowledgment.

2. The pipelined bus system of claim 1 wherein the request pipeline depth signal is modified responsive to a condition selected from the group consisting of an instantaneous reduction in system power consumption, a bus interface performance indicator, a receiving device performance indicator and a system performance indicator.

3. The pipelined bus system of claim 1 wherein the value Y is less than N, and wherein the sending device is further configured to responsively assert the second request signal comprising no more than Y transfer requests by requesting discrete reception acknowledgments for each of the N transfer requests and decrementing the number N by a value of one for each discrete reception acknowledgment.

4. The pipelined bus system of claim 1 wherein the receiving device is a cache snooper associated with a cache memory unit, and the cache snooper asserts the request pipeline depth signal and modified request pipeline depth signal; and
    the processor local bus interface is a bus macro configured to provide information sending and reception functions to arbitrate transfer requests between system sending devices and system receiving devices, and the bus macro is the sending device that samples the request and modified request pipeline depth signals and responsively asserts the first and second request signals.

5. The pipelined bus system of claim 1 wherein the sending device is a master, and the master samples the request and modified request pipeline depth signals and responsively asserts the first and second request signals; and
    the processor local bus interface is a bus macro configured to provide information sending and reception functions to arbitrate transfer requests between system sending devices and system receiving devices, and the bus macro is the receiving device and asserts the request and modified request pipeline depth signals.

6. The pipelined bus system of claim 1 wherein the processor local bus interface is a bus macro configured to provide information sending and reception functions to arbitrate transfer requests between system sending devices and system receiving devices, and the bus macro is the sending device that samples the request and modified request pipeline depth signals and responsively asserts the first and second request signals; and
    the receiving device is a slave, and the slave asserts the request and modified request pipeline depth signals.

7. The pipelined bus system of claim 1 wherein the bus macro, receiving devices and sending devices use a request and acknowledge protocol to communicate with each other.

8. The pipelined bus system of claim 1 wherein:
    the bus interface is a processor local bus macro configured to provide information sending and reception functions to arbitrate transfer requests between system sending devices and system receiving devices;
    the bus macro and receiving device are both configured to generate the request and modified request pipeline depth signal;
    the sending device is configured to sample the request and modified request pipeline depth signals generated by the bus macro and responsively assert the first and second request signals; and
    the bus macro is configured to sample the request and modified request pipeline depth signals generated by the receiving device and responsively assert the first and second request signal.

9. A method for pipelined bus system information transactions for use in interconnecting devices within a computer system comprising:
    a. providing a sending device;
    b. providing a receiving device connected to the sending device;
    c. the receiving device generating a request pipeline depth signal, the request pipeline depth signal indicating a number N of discrete transfer requests that may be received by the receiving device prior to acknowledgment to the sending device of receipt of the transfer requests;
    e. the sending device sampling the request pipeline depth signal;
    f. the sending device asserting a first request signal responsive to the request pipeline depth signal without waiting for a first request reception acknowledgment the first request signal comprising no more than N transfer requests;
    g. the receiving device generating a modified request pipeline depth signal indicating a number Y of discrete transfer requests that may be received by the receiving device prior to acknowledgment to the sending device of receipt of the transfer requests;
    h. the sending device then receiving a first request reception acknowledgment from the receiving device;
    i. the sending device sampling the modified request pipeline depth signal;
    j. the sending device asserting a second request signal without waiting for a second request reception acknowledgment responsive to the modified request pipeline depth signal, the second request signal comprising no more than Y transfer requests.

10. The method of claim 9 wherein the request pipeline depth signal is modified responsive to a condition selected from the group consisting of an instantaneous reduction in system power consumption, a bus interface performance indicator, a receiving device performance indicator and a system performance indicator.

11. The method of claim 9 wherein the value Y is less than N, and further comprising the step of configuring the sending device to responsively assert the second request signal comprising no more than Y transfer requests by requesting discrete reception acknowledgments for each of the N transfer requests and decrementing the number N by a value of one for each discrete reception acknowledgment.

12. The method of claim 9 wherein the receiving device is a cache snooper associated with at least one cache memory unit, and the cache snooper asserts the request pipeline depth signal and modified request pipeline depth signal; and the processor local bus interface is a bus macro configured to provide information sending and reception functions to arbitrate transfer requests between system sending devices and system receiving devices, and the bus macro is the sending device that samples the request and modified request pipeline depth signals and responsively asserts the first and second request signals.

13. The method of claim 9 wherein the sending device is a master, and the master samples the request pipeline depth signal and modified request pipeline depth signal and responsively asserts the first and second request signals; and the processor local bus interface is a bus macro configured to provide information sending and reception functions to arbitrate transfer requests between system sending devices and system receiving devices, and the bus macro is the receiving device and asserts the request and modified request pipeline depth signals.

14. The method of claim 9 wherein the receiving device is a slave, and the slave asserts the request and modified request pipeline depth signals, and the processor local bus interface is a bus macro configured to provide information sending and reception functions to arbitrate transfer requests between system sending devices and system receiving devices, and the bus macro is the sending device that samples the request and modified request pipeline depth signals and responsively asserts the first and second request signals.

15. The method of claim 9 wherein the receiving devices and sending device use a request and acknowledge protocol to communicate with each other.

16. A method for pipelined bus system information transactions for use in interconnecting devices within a computer system comprising:

a. providing a processor local bus macro configured to provide information sending and reception functions to arbitrate transfer requests between system sending devices and system receiving devices;
b. connecting a sending device to the bus macro;
c. connecting a receiving device to the bus macro;
d. the receiving device generating a request pipeline depth signal, the request pipeline depth signal indicating a number N of discrete transfer requests that may be received prior to acknowledgment of receipt of the transfer requests;
e. one of the bus macro and the sending device sampling the request pipeline depth signal;
f. the sampling one of the bus macro and the sending device asserting a first request signal responsive to the request pipeline depth signal without waiting for a first request reception acknowledgment, the first request signal comprising no more than N transfer requests;
g. the receiving device modifying the at least one request pipeline depth signal to either increase or decrease the number N to a number Y, thereby generating a modified request pipeline depth signal;
h. the asserting bus macro or sending device then receiving a first request reception acknowledgment;
i. the asserting bus macro or sending device sampling the modified request pipeline depth signal;
j. the asserting bus macro or sending device asserting a second request signal without waiting for a second request reception acknowledgment responsive to the modified request pipeline depth signal, the second request signal comprising no more than Y transfer requests.

17. The pipelined bus system of claim 1 further comprising a second receiving device 2R connected to the sending device through the processor local bus interface;

wherein the second receiving device 2R asserts a second receiving device request pipeline depth signal 2RPDS, the 2RPDS indicating a number M of discrete transfer requests that may be sent by the sending device prior to acknowledgment of receipt of a transfer request by the second receiving device 2R;

wherein the sending device is configured to sample the 2RPDS and responsively assert a second receiving device first request signal comprising no more than M transfer requests without waiting for a second receiving device first request reception acknowledgment;

wherein the second receiving device 2R is configured to modify the 2RPDS to either increase or decrease the number M to a number Z in a modified second request pipeline depth signal Mod2RPDS prior or subsequent to a second receiving device first request reception acknowledgement received by the sending device, and the sending device is configured to sample the Mod2RPDS after a second receiving device first request reception acknowledgment and responsively assert a second receiving device second request signal comprising no more than Z transfer requests without waiting for a second receiving device second request reception acknowledgment; and wherein M may be divergent from N, and Z may be may be divergent from Y.

18. The method of claim 9, further comprising the steps of:

connecting a second receiving device 2R to the sending device through the processor local bus interface;
the second receiving device 2R asserting a second receiving device request pipeline depth signal 2RPDS, the 2RPDS indicating a number M of discrete transfer requests that may be sent by the sending device prior to acknowledgment of receipt of a transfer request by the second receiving device 2R;
the sending device sampling the 2RPDS and responsively asserting a second receiving device first request signal comprising no more than M transfer requests without waiting for a second receiving device first request reception acknowledgment;
the second receiving device 2R modifying the 2RPDS to either increase or decrease the number M to a number Z in a modified second request pipeline depth signal Mod2RPDS prior or subsequent to a second receiving device first request reception acknowledgement received by the sending device; and the sending device sampling the Mod2RPDS after a second receiving device first request reception acknowledgment and responsively asserting a second receiving device second request signal comprising no more than Z transfer requests without waiting for a second receiving device second request reception acknowledgment;

wherein M may be divergent from N, and Z may be may be divergent from Y.

19. The method of claim 16, further comprising the steps of:

connecting a second receiving device 2R to the bus macro;

the second receiving device 2R generating a second receiving device request pipeline depth signal 2RPDS, the 2RPDS indicating a number M of discrete transfer requests that may be sent by the sending device prior to acknowledgment of receipt of a transfer request by the second receiving device 2R;

one of the bus macro and the sending device sampling the 2RFDS and responsively asserting a second receiving device first request signal comprising no more than M transfer requests without waiting for a second receiving device first request reception acknowledgment;

the second receiving device 2R modifying the 2RPDS to either increase or decrease the number M to a number Z in a modified second request pipeline depth signal Mod2RPDS prior or subsequent to a second receiving device first request reception acknowledgement received by one of the bus macro and the sending device; and one of the bus macro and the sending device sampling the Mod2RPDS after a second receiving device first request reception acknowledgment and responsively asserting a second receiving device second request signal comprising no more than Z transfer requests without waiting for a second receiving device second request reception acknowledgment;

wherein M may be divergent from N, and Z may be may be divergent from Y.

* * * * *